US009342585B2

(12) United States Patent
Yang et al.

(10) Patent No.: US 9,342,585 B2
(45) Date of Patent: May 17, 2016

(54) TEXT SEARCHING METHOD AND DEVICE AND TEXT PROCESSOR

(75) Inventors: Jian Long Yang, Beijing (CN); Xing Xing Shen, Beijing (CN); Jia Tian Zhong, Beijing (CN); Cai Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1774 days.

(21) Appl. No.: 12/417,974

(22) Filed: Apr. 3, 2009

(65) Prior Publication Data

US 2009/0292693 A1 Nov. 26, 2009

(30) Foreign Application Priority Data

May 26, 2008 (CN) .......................... 2008 1 0098174

(51) Int. Cl.
G06F 17/30 (2006.01)

(52) U.S. Cl.
CPC ................................ *G06F 17/30672* (2013.01)

(58) Field of Classification Search
CPC ................................................ G06F 17/30675
USPC ........................................................ 707/767
See application file for complete search history.

(56) References Cited

U.S. PATENT DOCUMENTS

| 5,530,794 | A * | 6/1996 | Luebbert | 715/210 |
|---|---|---|---|---|
| 6,934,767 | B1 * | 8/2005 | Jellinek | 709/247 |
| 7,236,923 | B1 | 6/2007 | Gupta | |
| 7,366,500 | B1 * | 4/2008 | Yalovsky et al. | 455/414.1 |
| 2004/0194141 | A1 * | 9/2004 | Sanders | 725/53 |
| 2007/0005563 | A1 | 1/2007 | Aravamudan et al. | |
| 2007/0050351 | A1 | 3/2007 | Kasperski et al. | |
| 2007/0061321 | A1 | 3/2007 | Venkataraman et al. | |
| 2007/0233463 | A1 * | 10/2007 | Sparre | 704/10 |

(Continued)

FOREIGN PATENT DOCUMENTS

WO WO0122290 3/2001

OTHER PUBLICATIONS

Yeates, Stuart, et al., "Using Compression to Identify Acronyms in Text"; pp. 1-11.

(Continued)

*Primary Examiner* — James Trujillo
*Assistant Examiner* — Kurt Mueller
(74) *Attorney, Agent, or Firm* — DeLizio Law, PLLC

(57) ABSTRACT

The present invention provides a text searching method including the steps of: extracting initials of corresponding words in a text to be searched according to a predetermined extracting rule to form an initial character string; creating mapping relation between the extracted initial character string and the text to be searched; performing matching between the initial character string and an abbreviation character string to be searched for; and determining an expanded phrase corresponding to the abbreviation character string to be searched for and a location of the expanded phrase in the text to be searched according to a result of the matching and the mapping relation. The invention further provides a text searching device for implementing the method and a text processor including the text searching device. With the invention, a searching function can be implemented precisely and efficiently to locate an expanded phrase of a phrase abbreviation in the text to be searched, even if a user only knows the phrase abbreviation but can not completely spell the expanded phrase thereof.

15 Claims, 2 Drawing Sheets

(56) References Cited

U.S. PATENT DOCUMENTS

2008/0086297 A1* 4/2008 Li et al. .............................. 704/3
2009/0259629 A1* 10/2009 Wei et al. .......................... 707/3

OTHER PUBLICATIONS

Knuth, Donald E., et al., "Fast Pattern Matching in Strings"; SIAM J. Comput, vol. 6, No. 2, Jun. 1977, pp. 323-350.

Boyer, Robert S., et al., "A Fast String Searching Algorithm", Communications of the ACM, vol. 18, No. 6, Jun. 1975; Association for Computing Machinery, Inc., 1977, pp. 762-340.

Aho, Alfred V., et al., "Efficient String Matching: An Aid to Bibliographic Search"; Communications of the ACM, vol. 18, No. 6, Jun., 1975; pp. 333-340; Association for Computing Machinery, Inc., 1975.

\* cited by examiner

TEXT SEARCHING METHOD AND DEVICE AND TEXT PROCESSOR

CROSS-REFERENCE TO RELATED APPLICATIONS

The present application claims the benefit under 35 U.S.C. §119 of China; Application Serial Number CN200810098174.0, filed May 26, 2008 entitled "Text Searching Method and Device and Text Processor" which is incorporated herein by reference.

FIELD OF THE INVENTION

The present invention generally relates to the field of text processing technologies, and in particular to a text searching method and device and a text processor.

BACKGROUND OF THE INVENTION

Text processors such as Adobe Reader, MS Word, UltraEditor and Web browser are widely used at present (hereinafter collectively referred to as a "text processor"). The most frequently used function in a text processor is "searching", which is to search for a word or a phrase in a text. However, almost all the text processors can only search for an entire expanded phrase specified by a user and not search for any fragment of a phrase, such as an abbreviation character string. Stated in another way, if the user only knows the abbreviation of a phrase but can not completely spell the expanded phrase, the "searching" function may not work. For example, if the user who reads a DB2 SQL reference manual with a text processor wants to start a session about the "RCTE" (which stands for the expanded phrase "Recursive Common Table Expression"), and he only knows the abbreviation character string "RCTE" of the phrase but can not spell the expanded phrase corresponding to the abbreviation, the function of "searching" in the text processor, such as Adobe Reader, MS Word, or the like, can not search in a specified text for the corresponding phrase "Recursive Common Table Expression" in accordance with the abbreviation character string "RCTE" to be searched for as offered by the user.

There are some solutions in the prior art which provide limited in text searching for expanded phrases via an abbreviation character string.

In UltraEditor, "Regular Expressions" is used to search for a corresponding expanded phrase via an abbreviation character string. Since UltraEditor integrates "Regular Expressions" into its searching tool, rules of the "Regular Expression" can be used to create a regular expression by an initial abbreviation of a phrase and some other special characters, and the regular expression is used to search in a text for the expanded phrase corresponding to the abbreviation character string. However, it may be difficult for users who are not conversant with computer technology to grasp "Regular Expressions", and thus, this function in UltraEditor is not popular with general users. Furthermore, the Adobe Reader, MS Word and almost all the Web browsers could not support the "Regular Expressions".

A method proposed in U.S. Pat. No. 6,934,767 automatically searches for an abbreviation substring based on preceding and following word delimiters, determines that it is one of a set of abbreviation substrings, and produces an expanded character string by replacing the abbreviation substring with its expanded substring. This method requires a prepared mapping table between the abbreviation substrings and the expanded substrings, which mapping table may vary from one user to another. Consequently, such a method may not be suitable for the general searching function.

SUMMARY OF THE INVENTION

In view of the above problems present in the prior art, there is provided according to a first aspect of the invention a text searching method including the steps of: (1) extracting initials of corresponding words in a text to be searched according to a predetermined extracting rule to form an initial character string; (2) creating a mapping relation between the extracted initial character string and the text to be searched; (3) performing matching between the initial character string and an abbreviation character string to be searched for; and (4) determining an expanded phrase corresponding to the abbreviation character string to be searched and a location of the expanded phrase in the text to be searched according to a result of the matching and the mapping relation.

According to a second aspect of the invention, there is provided a text searching device including: (1) an extracting unit for extracting initials of corresponding words in a text to be searched according to a predetermined extracting rule to form an initial character string; (2) a creating unit for creating mapping relation between the extracted initial character string and the text to be searched; (3) a matching unit for performing matching between the initial character string and an abbreviation character string to be searched; and (4) a locating unit for determining an expanded phrase corresponding to the abbreviation character string to be searched and a location of the expanded phrase in the text to be searched according to a result of the matching and the mapping relation.

According to a third aspect of the invention, there is provided a text processor including the text searching device according to the second aspect of the invention.

With the invention, a searching function can be performed precisely and efficiently to locate an expanded phrase of a phrase abbreviation in the text to be searched, even if a user only knows the phrase abbreviation but can not completely spell the expanded phrase thereof.

BRIEF DESCRIPTION OF THE DRAWINGS

The above and other objects, features and advantages of the invention will become apparent from the descriptions of the embodiments of the invention taken in conjunction with the drawings in which.

DETAILED DESCRIPTION OF THE INVENTION

Figure 1:
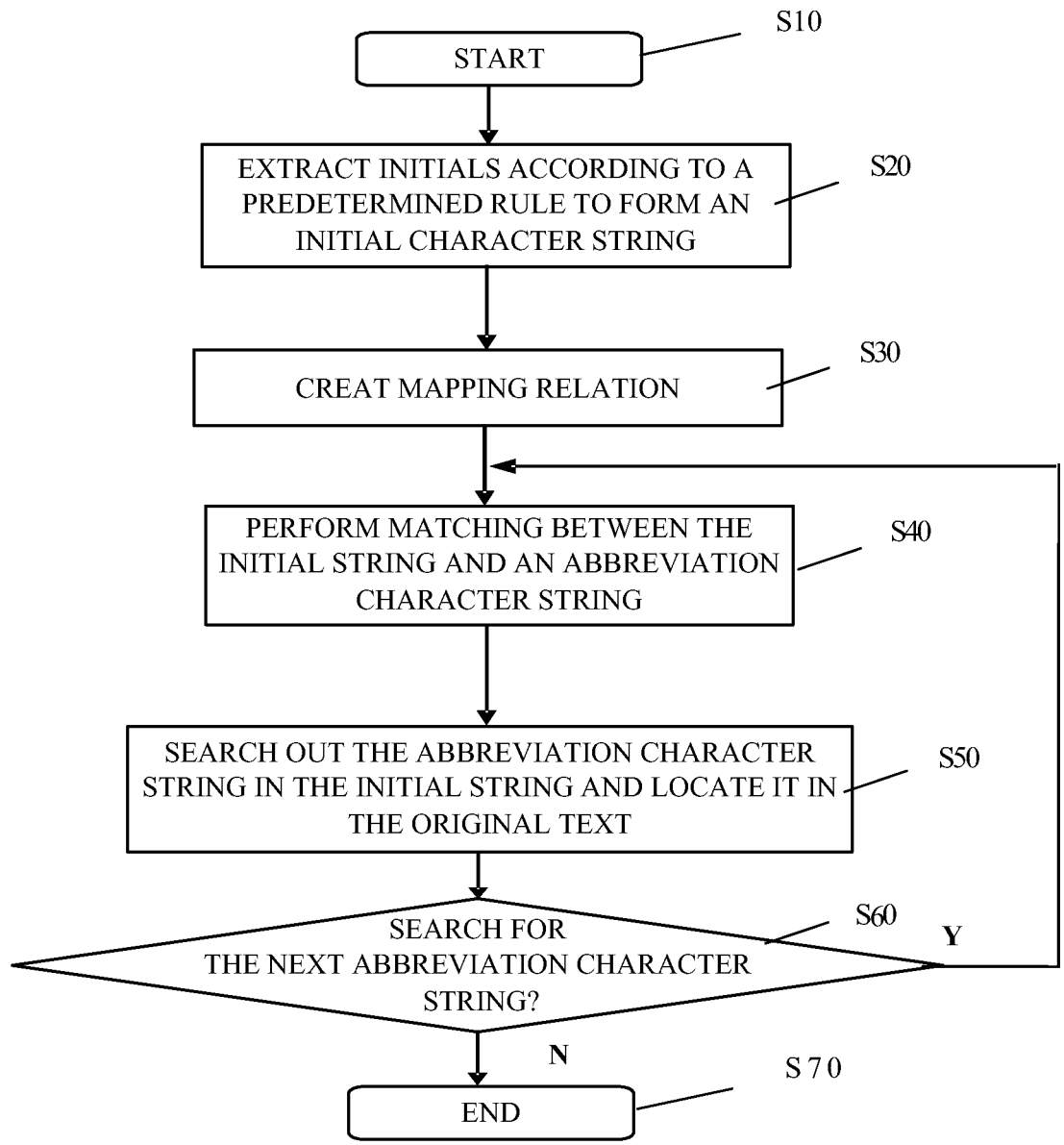
FIG. 1 illustrates a simplified flow diagram of a text searching method according to an embodiment of the invention.

FIG. 1 illustrates a simplified flow diagram of a text searching method according to an embodiment of the invention. As illustrated, if it is required to search in a text to be searched for an expanded phrase corresponding to a known abbreviation character string, then a specific flow of the method according to the present invention is as follows.

Initials of corresponding words in the text to be searched are extracted according to a predetermined extracting rule to form an initial character string (S20). Initials of all words in the text or those words which, for example, express main meaning of the text can be extracted dependent upon different extracting rules. The user may define the extracting rule as needed in practice, which will be further detailed below.

Mapping relation between the extracted initial character string and the text to be searched is created, and the mapping relation includes an expanded word corresponding to each initial and a location of the expanded word in the text to be searched (S30). For example, the mapping relation can be recorded in a data structure such as a mapping table, and the like.

The extracted initial character string is matched with an abbreviation character string to be searched for so as to search in the initial character string for the abbreviation character string (S40). Various common character string matching methods in the art can be used to implement the matching.

An expanded phrase corresponding to the abbreviation character string to be searched for and the specific location of the expanded phrase in the text to be searched are determined from a result of the matching process in combination with the created mapping relation between the initial character string and the text to be searched, thereby locating the expanded phrase corresponding to the abbreviation character string in the text to be searched (S50).

If it is required to search for a next abbreviation character string to be searched for (a determination result of "Yes" in the step S60), then the flow returns to step S40 and repeats the processes of steps S40-S60; otherwise the flow ends (S70).

A specific example of the above described text searching method according to the invention will be presented below.

It is supposed that a user browsing a paper about Java thread wants to search in the following text of the paper for an expanded phrase "Java Virtual Machine" corresponding to an abbreviation character string "JVM" to be searched for, but the user does not know how to correctly spell the expanded phrase.

Chapter 1. Introduction to Threading

This is a book about using threads in the Java programming language and the Java virtual machine. The topic of threads is very important in Java—so important that many features of a threaded system are built into the Java language itself, while other features of a threaded system are required by the Java virtual machine. Threading is an integral part of using Java.

According to the present invention, the first step is to extract initials of corresponding words in the text to be searched according to a predetermined extracting rule to create the following initial character string:

CIT . . . TbutJplJvmttiJitmftsbJliwoftsrJvmTipuJ . . .

The predetermined extracting rule can be set by the user as needed. For example, nouns, verbs, adjectives and adverbs are main constituent elements of contents of a text and they express main meaning of the text. Therefore, the extracting rule can be set as extracting the initials of only nouns, verbs, adjectives and adverbs in the text to be searched. Alternatively, the user can define a "little-word-book" for storage of some little words which the user does not want to extract, e.g., "a", "an", "the", "this", and the like. If the user sets the extracting rule as "Removing little words", then the initials of the little words present in the "little-word-book" will not be extracted in the extracting process. Of course, the user may not set the extracting rule of "Removing little words", and then the initials of the little words will also be extracted in the extracting process. As for EOF (End Of File), for example, if the user does not set the extracting rule of "Removing little words", then the initial "o" in the word "Of" will be extracted to form the initial character string. In this example, the extracting rule is set as executing no extracting process for some little words, such as, "a", "the", "and", "about", "in", and the like. It will be further noted that digits are regarded in this example as little words that shall be ignored. However, in a case of inclusion of a digit in an abbreviation character string to be searched for, e.g., "3GPP", the initial of the digit shall also be taken into account in the extracting process. It is generally unnecessary to search a picture containing words, which picture is present in the text. As for a table, the function of searching in the text for the expanded phrase via the abbreviation character string according to the invention can be enabled by setting a specific predetermined rule for a table. For example, different elements of the table are set as different paragraphs in which to search via the abbreviation character string in the same manner as that for the paragraphs of the text.

In the case of presence of words having uppercase initials in the text to be searched, if the user only regards the words having the uppercase initials as the expanded phrase potentially corresponding to the abbreviation character string, then the extracting rule can be set as "Extracting only words having uppercase initials". As such, only this type of words will be extracted in the extracting process. Of course, if the user also regards words having lowercase initials as the expanded phrase potentially corresponding to the abbreviation character string, then uppercase and lowercase initials will not be distinguished in the extracting process. For example, if the user also regards words having lowercase initials as the potentially corresponding expanded phrase, then the initial character string "ufo" will be extracted when a phrase "unidentified flying object" is included in the text.

Additionally, a word that per se is an abbreviation, e.g., "JVM", may be present in the text. The user can determine the word by defining the extracting rule. For example, if the extracting rule is set as determining more than three consecutive uppercase letters as an abbreviation, then each letter, instead of only the initial, of the abbreviation, e.g., "JVM", "FVT", will be extracted in the extracting process.

It can be readily appreciated that the user can set any appropriate extracting rule in view of the purpose and efficiency of the text searching and can apply any one or combination of the above extracting rules.

The second step is to create a mapping relation between the extracted initial character string and the text to be searched based on which extracting process is performed. The mapping relation may be in the form of a mapping table as illustrated in Table 1, for example.

TABLE 1

Mapping relation between extracted initial character string and text to be searched

| | | |
|---|---|---|
| 1 | C | Chapter + Loc(1) |
| 2 | I | Introduction + Loc(2) |
| . . . | . . . | . . . |
| N | J | Java + Loc(N) |
| N + 1 | v | virtual + Loc(N + 1) |
| N + 2 | m | machine + Loc(N + 2) |
| . . . | . . . | . . . |

As can be apparent from Table 1, the first column counting from the left in the table denotes a serial number of each initial of the extracted initial character string in the initial character string, the second column counting from the left denotes the respective initials in the extracted initial character string, and the third column counting from the left denotes the expanded words in the text to be searched corresponding to the respective initials and their locations in the text to be searched. For example, information in the first row of Table 1 indicates that the character "C" in the extracted initial character string is the first character in the initial character string, and its corresponding expanded word in the text to be searched is "Chapter", and this expanded word has the location as indicated by Loc (1) in the text to be searched. For example, the location Loc (1) may indicate the location in sequence of the expanded word in the text to be searched or coordinates (by row and column) of the expanded word in the text to be searched. It is sufficient that the location can be used to locate the expanded word in a window of the text to be searched. Those skilled in the art may appreciate that a data structure in a form other than the mapping table in FIG. 1 can also be used to record the mapping relation between the extracted initial character string and the text to be searched, for example, a relational database, a data chain, an array, and the like. It will be appreciated that the information in the first column counting from the left in Table 1 is not essential to implementation of the method according to the present invention.

The third step is to match the extracted initial character string with the abbreviation character string to be searched for, "JVM", by using a character string matching method in accordance with the mapping relation, that is, to search in the mapping, for example as in Table 1 or the like, for initials matching with the abbreviation character string to be searched for, "JVM", for example, the initials numbered "N", "N+1" and "N+2" in the extracted initial character string, and to obtain the expanded words "Java", "virtual" and "machine" corresponding to these initials, respectively. The location information Loc (N), Loc (N+1) and Loc (N+2) may be used to locate the specific locations of the expanded words in the text to be searched. The used character matching method may include a direct matching method. Examples may include the Brute Force method, the Knut-Morris-Pratt method [see D. E. Knuth, J. H. Morris Jr. and V. R. Pratt, Fast Pattern Matching In Strings, SIAM J. Comput. 6(2) (1977) 323-350], the Boyer-Moore method [see R. S. Boyer and J. S. Moore, A Fast String Searching Algorithm., Comm. ACM20 (10) (1977) 762-772], and/or Aho-Corasick method [see A. V. Aho and M. Corasick, Efficient String Matching: An Aid to Bibliographic Search, Comm. ACM18(6) (1975) 333-340]. Any of these methods may be applicable to the present disclosure provided that the method can be used to search in the initial character string for the abbreviation character string.

The fourth step is to, after obtaining the expanded words corresponding to the abbreviation character string to be searched and their locations in the text to be searched, locate and highlight the search result "Java virtual machine" in the text to be searched.

As such, if the user wants to search in the text for "JVM", he can type the abbreviation character string to be searched for, "JVM", in a search input field and then activate the text searching method according to the present invention, for example, by means of a mouse click, and thus can find the abbreviation character string "JVM" twice in the initial character string and locate a phrase of the expanded words "Java virtual machine" corresponding to the abbreviation character string "JVM" in the text to be searched in accordance with the mapping table 1.

Those skilled in the art would appreciate that the method according to the present invention will not be limited to the details described in the above specific examples and can be modified variously as described below.

The method according to the present invention can be used to divide the text to be searched into parts by paragraphs and to extract several initial character strings from the respective parts for processing. This has advantages of increasing a searching speed and of preventing cross-paragraph words from being determined as the expanded phrase corresponding to the abbreviation character string to be searched for. To this end, initial character strings are extracted from the text per paragraph in the extracting process, and a line feed character is regarded as a flag of the end of a paragraph. Each paragraph corresponds to an individual initial character string after the extracting process, and all the initial character strings extracted from the entire text are numbered by the sequence of the paragraphs. In the searching process, rapid double locating of the paragraph and the expanded word can be enabled according to the number of the paragraph. In the above example, a mapping table can be created respectively for each paragraph, or a general mapping table can be created for all paragraphs while a parameter concerning the paragraph number is added to distinguish information of the mapping relation in the general mapping table, and the information of the mapping relation is associated with the respective paragraphs in the text to be searched. For example in the above mapping Table 1, paragraph number information can be added in the initial number of the first column counting from the left, and a parameter "(M, N)" can be used to indicate the $N^{th}$ initial in the initial character string extracted from the $M^{th}$ paragraph of the text, where M is the information concerning the paragraph number. The specific extracting process for each paragraph can be executed as described above and repeated descriptions thereof will be omitted. In this way, initials extracted from the words crossing the end of a preceding paragraph and the start of a following paragraph, i.e., cross-paragraph words, will not be determined to match with the abbreviation character string to be searched for due to presence of the information concerning the paragraph number for distinguishing.

Of course, the user can search in a specified part of the text. The specific part may not be one or more complete paragraphs but an arbitrary part of the text. A search range of the text to be searched can be specified in various ways. For example, the search range may be set as contents from the $N^{th}$ word of the $L^{th}$ line of the $M^{th}$ paragraph to the $N^{th}$ word of the $L^{th}$ line of the $M^{th}$ paragraph in the text. Alternatively, the search range may be selected directly with a pointing device, for example, by dragging a mouse.

In the method according to the present invention, the time when the extracting process and the mapping relation creating process are executed can be determined by the user as needed. For example, the pre-processes of extracting the initial character string, creating the mapping relation, and the like, can be executed prior to actual execution of the text searching process. Alternatively, background execution of the pre-processes can be user-defined, that is, all texts in a system can be automatically processed in advance when the system is idle to improve the searching speed. If the pre-processes are executed in the background, an issue of how to update the text may be involved. Stated in another way, a pre-processed text may be modified by the user prior to the actual execution of the text searching process, and in such a case, an error may occur in the search result. In a possible solution, once the text has been updated, results of executing the extracting and mapping relation creating processes will be updated automatically with a modification to the text to be searched. In an alternative solution, the time to create the mapping relation is recorded, and the latest modification time of the current text is compared with the time to create the mapping relation at the time of or prior to the actual execution of the text searching process. If the time to create the mapping relation is later than the latest modification time of the current text, the results of the extracting and mapping relation creating processes will be updated. In another alternative solution, the user can make an explicit update to obtain actual contents of the current text and execute the extracting and mapping relation creating processes on the modified text. Of course, the extracting and mapping relation creating processes may also be started upon execution of the searching process. In this way, the extracting and mapping relation creating processes can be executed newly on the entire modified text, or the results of the extracting and mapping relation creating processes can be updated for the modified part of the text according to the modified contents.

Figure 2:
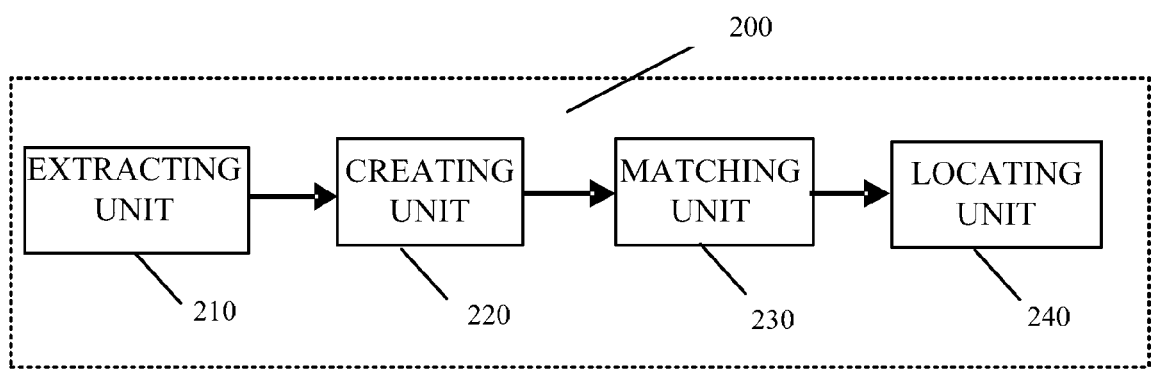
FIG. 2 illustrates a block diagram of a text searching device according to an embodiment of the invention.

FIG. 2 illustrates a block diagram of a text searching device 200 according to the present invention. As illustrated in FIG. 2, the text searching device 200 includes an extracting unit 210, a creating unit 220, a matching unit 230 and a locating unit 240 sequentially coupled together. The extracting unit 210 extracts initials of corresponding words in a text to be searched according to a predetermined extracting rule to form an initial character string. The extracting unit 210 can implement the process of the above described step S20 in the text searching method according to the invention. The corresponding words for which the extracting process is to be executed can be determined according to the extracting rule preset by the user. This extracting rule can be any one of the various extracting rules used in the above described step S20, for example. The creating unit 220 creates mapping relation between the extracted initial character string and the text to be searched. The creating unit 220 can implement the process of the above described step S30 in the text searching method according to the invention. The mapping relation includes the expanded word corresponding to each initial in the initial character string and the specific location of the expanded word in the text to be searched, and can be recorded in a form of a data structure such as the mapping table illustrated in FIG. 1, a relational database, a data chain, an array, and the like. The matching unit 230 matches the extracted initial character string with the abbreviation character string to be searched for, so as to search in the initial character string for the abbreviation character string. The matching unit 230 can implement the process of the above described step S40 in the text searching method according to the invention. Various common character string matching methods in the art may be used to implement the match, for example, the direct matching method, the Knuth-Morris-Pratt method, the Boyer-Moore method, the Aho-Corasick method, and the like. The locating unit 240 determines the expanded phrase corresponding to the abbreviation character string to be searched for and the specific location of the expanded phrase in the text to be searched based on a processing result of the matching unit in combination with the created correspondence relation between the initial character string and the text to be searched. The locating unit 240 can implement the process of the above described step S50 in the text searching method according to the invention, thereby locating the expanded phrase corresponding to the abbreviation character string to be searched for in the text to be searched.

The time when the extracting unit 210 and the creating unit 220 execute the extracting process and the mapping relation creating process can be determined by the user as needed. For example, the extracting unit 210 and the creating unit 220 can be configured to execute the pre-processes of extracting the initial character string and of creating the mapping relation prior to the actual execution of the text searching process. Various implementing modes in the above described steps of the method according to the present invention can be made reference to for details of the pre-processes, which will not be described here again.

Furthermore, the extracting unit 210 can be configured to divide the text to be searched into parts by paragraphs and to extract several initial character strings from the respective parts for processing. The creating unit 220 can create a mapping relation respectively for each paragraph or create a general mapping relation for all the paragraphs, with a paragraph number being the identification information. The way of executing the above described steps S20 and S30 for the text to be searched per paragraph in the text searching method according to the invention can be made reference to for details of the processes by the extracting unit 210 and the creating unit 220, which will not be described here again.

Those skilled in the art would appreciate that the respective constituent function units in the text searching device 200 according to the invention can be implemented through software, hardware or a combination thereof, for example.

The text searching device 200 according to the invention can be incorporated in a general text processor in the prior art to thereby implement the method for searching in the text via the abbreviation character string according to the invention as illustrated in FIG. 1. Therefore, the text processor capable of implementing the text searching method according to the invention shall also be deemed to be within the disclosure of the present invention.

Furthermore, the invention also proposes a machine readable program which, when being installed and executed in a machine such as a computer, can implement the above described text searching method according to the invention.

A storage medium in which the above machine readable program is carried will also come into the scope of the invention. Such a storage medium includes but will not be limited to a floppy disk, an optical disk, an optical-magnetic disk, a memory card, a memory stick, and the like.

Although the invention has been disclosed with the above descriptions of the embodiments of the invention, it shall be appreciated that those skilled in the art can make various modifications, adaptations or equivalents of the invention without departing from the spirit and scope of the appended claims, and these modifications, adaptations or equivalents shall also be deemed to be within the scope of the invention defined by the appended claims or the equivalents thereof.

The invention claimed is:

1. A text searching method comprising:
    extracting initials of words in a text to be searched, wherein the extracting is performed according to a predetermined extracting rule;
    forming an initial character string including the initials;
    creating a mapping relation between the initial character string and the text to be searched;
    identifying an abbreviation character string, wherein the abbreviation character string represents an abbreviation of some of the words in the text to be searched;
    performing matching between the initial character string and the abbreviation character string; and
    determining, based on the matching, an expanded phrase corresponding to the abbreviation character string, wherein the expanded phrase includes some of the words in the text to be searched;
    determining, based on the matching and the mapping relation, locations of the expanded phrase in the text to be searched.

2. The text searching method according to claim 1, wherein the predetermined extracting rule in the extracting is at least one of:
    extracting the initials of all the words in the text to be searched;

executing no extracting process for little words in the text to be searched, wherein the little words do not express main meaning of the text;

extracting the initials of only those of the words having uppercase initials in the text to be searched; and extracting each of more than one consecutive uppercase letters in the words of the text to be searched.

3. The text searching method according to claim 1, wherein the mapping relation between the initial character string and the text to be searched comprise an expanded word in the text to be searched corresponding to each initial in the initial character string and a location of the expanded word in the text to be searched.

4. The text searching method according to claim 3, wherein the mapping relation is recorded in at least one form of a mapping table, a relational database, a data chain and an array.

5. The text searching method according to claim 1, wherein the extracting and the creating the mapping relation are executed in advance the identifying the abbreviation character string.

6. The text searching method according to claim 1, wherein the matching between the extracted initial character string and the abbreviation character string is performed by using at least one of the following character string matching methods: the Brute Force method, the Knuth-Morris-Pratt method, the Boyer-Moore method and the Aho-Corasick method.

7. The text searching method according to claim 1, wherein in the extracting, the initial character string is extracted from the text to be searched per paragraph with a line feed character being a flag of an end of a paragraph, and wherein each paragraph corresponds to an individual initial character string after the extracting, and all initial character strings extracted from the entire text are numbered by sequence of the paragraphs.

8. A text searching device, comprising:

an extracting unit configured to extract initials of words in a text to be searched, wherein extraction is performed according to a predetermined extracting rule to form an initial character string;

a creating unit configured to create mapping relation between the initial character string and the text to be searched;

a matching unit configured to identify an abbreviation character string, wherein the abbreviation character string represents an abbreviation of some of the words in the text to be searched, and to perform matching between the initial character string and an abbreviation character string, wherein the abbreviation character string represents an abbreviation of some of the words in the text to be searched; and a locating unit configured to determine, based on the matching, an expanded phrase corresponding to the abbreviation character string, wherein the expanded phrase includes some of the words in the text to be searched, and determine, based on the mapping relation, a location of the expanded phrase in the text to be searched.

9. The text searching device according to claim 8, wherein the extraction is performed according to at least one of the following predetermined extracting rules:

extracting the initials of all words in the text to be searched;

performing no extraction for little words in the text to be searched, wherein the little words do not express main meaning of the text to be searched;

extracting the initials of only words having uppercase initials in the text to be searched; and extracting consecutive uppercase letters from the words having consecutive uppercase letters.

10. The text searching device according to claim 8, wherein the mapping relation includes an expanded word in the text to be searched corresponding to each initial in the initial character string and a location of the expanded word in the text to be searched.

11. The text searching device according to claim 10, wherein the mapping relation is recorded in at least one of a mapping table, a relational database, a data chain and an array.

12. The text searching device according to claim 8, wherein the extracting unit and the mapping relation creating unit are configured to execute in advance the extraction.

13. The text searching device according to claim 8, wherein the extracting unit and the mapping relation creating unit are configured to execute in advance of the extraction, and the text searching device is configured to:

record a time to create the mapping relation.

14. The text searching device according to claim 8, wherein the matching unit is configured to perform the matching by using at least one of the following character string matching methods:

Brute Force method, Knuth-Morris-Pratt method, Boyer-Moore method and Aho-Corasick method.

15. The text searching device according to claim 8, wherein the extracting unit is configured to extract the initial character string from the text to be searched per paragraph with a line feed character being a flag of an end of a paragraph, so that each paragraph corresponds to an individual initial character string after the extracting, and to number all the initial character strings extracted from the entire text by the sequence of the paragraphs.

* * * * *